US012671692B2

(12) United States Patent
Kishimoto

(10) Patent No.: US 12,671,692 B2
(45) Date of Patent: Jun. 30, 2026

(54) NETWORK SYSTEM AND CONTROL METHOD THEREOF

(71) Applicant: Canon Kabushiki Kaisha, Tokyo (JP)

(72) Inventor: Ryo Kishimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 18/320,262

(22) Filed: May 19, 2023

(65) Prior Publication Data

US 2023/0388311 A1     Nov. 30, 2023

(30) Foreign Application Priority Data

May 30, 2022     (JP) ................................. 2022-087882

(51) Int. Cl.
        *H04L 29/00*          (2006.01)
        *G06F 3/0484*        (2022.01)
        *H04L 9/40*            (2022.01)
(52) U.S. Cl.
        CPC .......... H04L 63/102 (2013.01); G06F 3/0484 (2013.01); H04L 63/0807 (2013.01)
(58) Field of Classification Search
        CPC .. H04L 63/102; H04L 63/0807; G06F 3/0484
        USPC .......................................................... 726/4
        See application file for complete search history.

(56) References Cited

U.S. PATENT DOCUMENTS

| | | | |
|---|---|---|---|
| 11,271,923 B2 | 3/2022 | Kishimoto | |
| 2014/0189808 A1* | 7/2014 | Mahaffey | G06F 21/6245 726/4 |
| 2017/0353468 A1* | 12/2017 | Petys | H04W 12/35 |
| 2020/0226596 A1 | 7/2020 | Takeuchi et al. | |

FOREIGN PATENT DOCUMENTS

JP          2020113085 A     7/2020

* cited by examiner

*Primary Examiner* — Jeffrey C Pwu
*Assistant Examiner* — Michael D Anderson
(74) *Attorney, Agent, or Firm* — Venable LLP

(57) ABSTRACT

A network system comprises an information processing device that uses a web app, a resource server that provides a resource, a client server that accesses the resource server, and an authorization server that permits the client server to access the resource server. The client server issues verification data capable of verifying a user having been authenticated, transmits an issuance request for the first access token to the authorization server according to a start of rendering of a page including a UI component from a web application, and transmits the received first access token. The information processing device transmits a request for resources. The resource server performs verification of the first access token, and transmits the resource to the UI component when the verification of the first access token is successful.

11 Claims, 14 Drawing Sheets

F I G.  3A

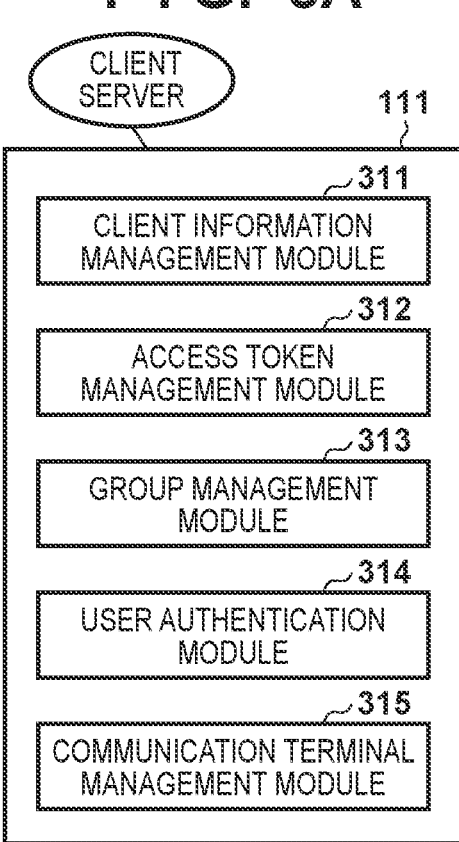

CLIENT SERVER   111

311   CLIENT INFORMATION MANAGEMENT MODULE

312   ACCESS TOKEN MANAGEMENT MODULE

313   GROUP MANAGEMENT MODULE

314   USER AUTHENTICATION MODULE

315   COMMUNICATION TERMINAL MANAGEMENT MODULE

F I G.  3B

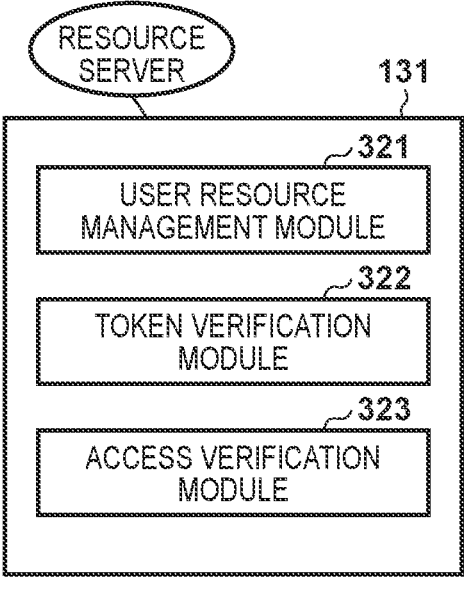

RESOURCE SERVER   131

321   USER RESOURCE MANAGEMENT MODULE

322   TOKEN VERIFICATION MODULE

323   ACCESS VERIFICATION MODULE

F I G.  3C

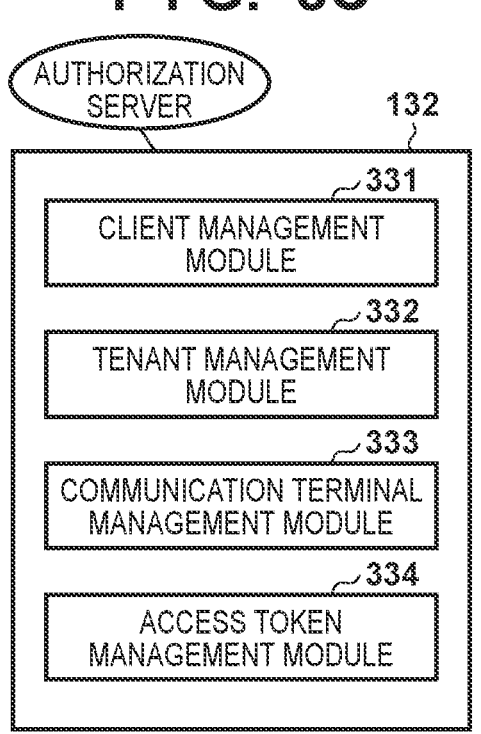

AUTHORIZATION SERVER   132

331   CLIENT MANAGEMENT MODULE

332   TENANT MANAGEMENT MODULE

333   COMMUNICATION TERMINAL MANAGEMENT MODULE

334   ACCESS TOKEN MANAGEMENT MODULE

F I G.  3D

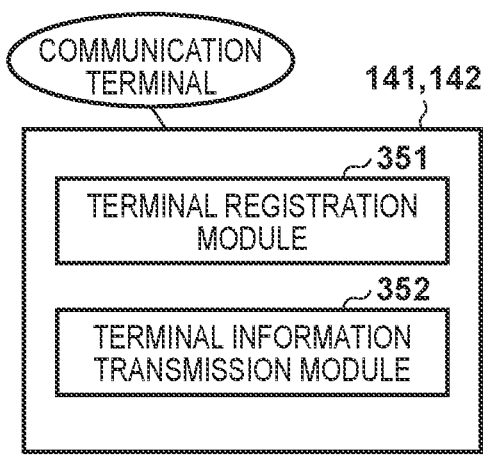

COMMUNICATION TERMINAL   141,142

351   TERMINAL REGISTRATION MODULE

352   TERMINAL INFORMATION TRANSMISSION MODULE

Figure 4A:
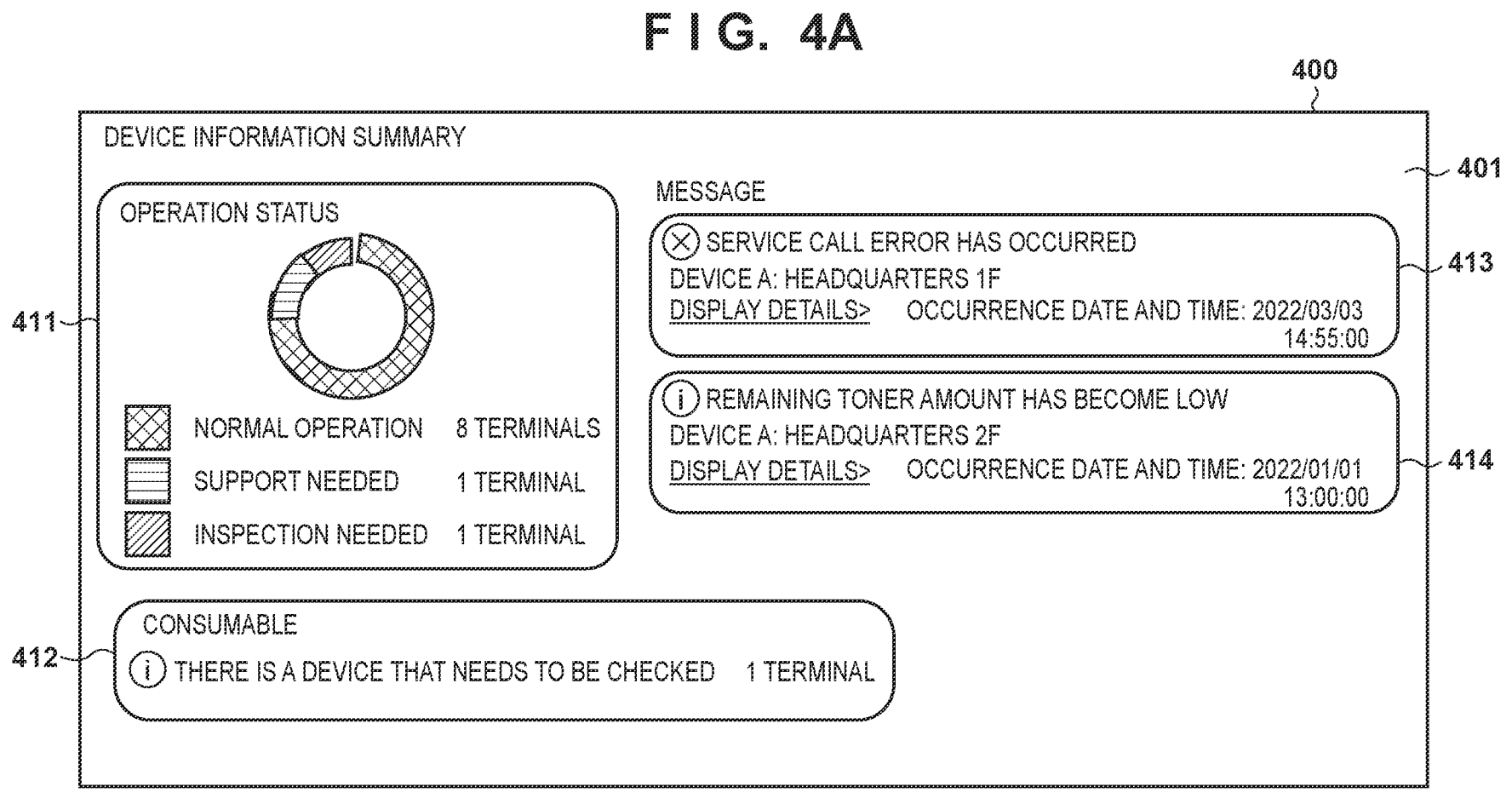

DEVICE INFORMATION SUMMARY

411

OPERATION STATUS

NORMAL OPERATION    8 TERMINALS

SUPPORT NEEDED    1 TERMINAL

INSPECTION NEEDED    1 TERMINAL

412

CONSUMABLE (i) THERE IS A DEVICE THAT NEEDS TO BE CHECKED    1 TERMINAL

MESSAGE

413

(X) SERVICE CALL ERROR HAS OCCURRED

DEVICE A: HEADQUARTERS 1F    OCCURRENCE DATE AND TIME: 2022/03/03

DISPLAY DETAILS>    14:55:00

414

(i) REMAINING TONER AMOUNT HAS BECOME LOW

DEVICE A: HEADQUARTERS 2F    OCCURRENCE DATE AND TIME: 2022/01/01

DISPLAY DETAILS>    13:00:00

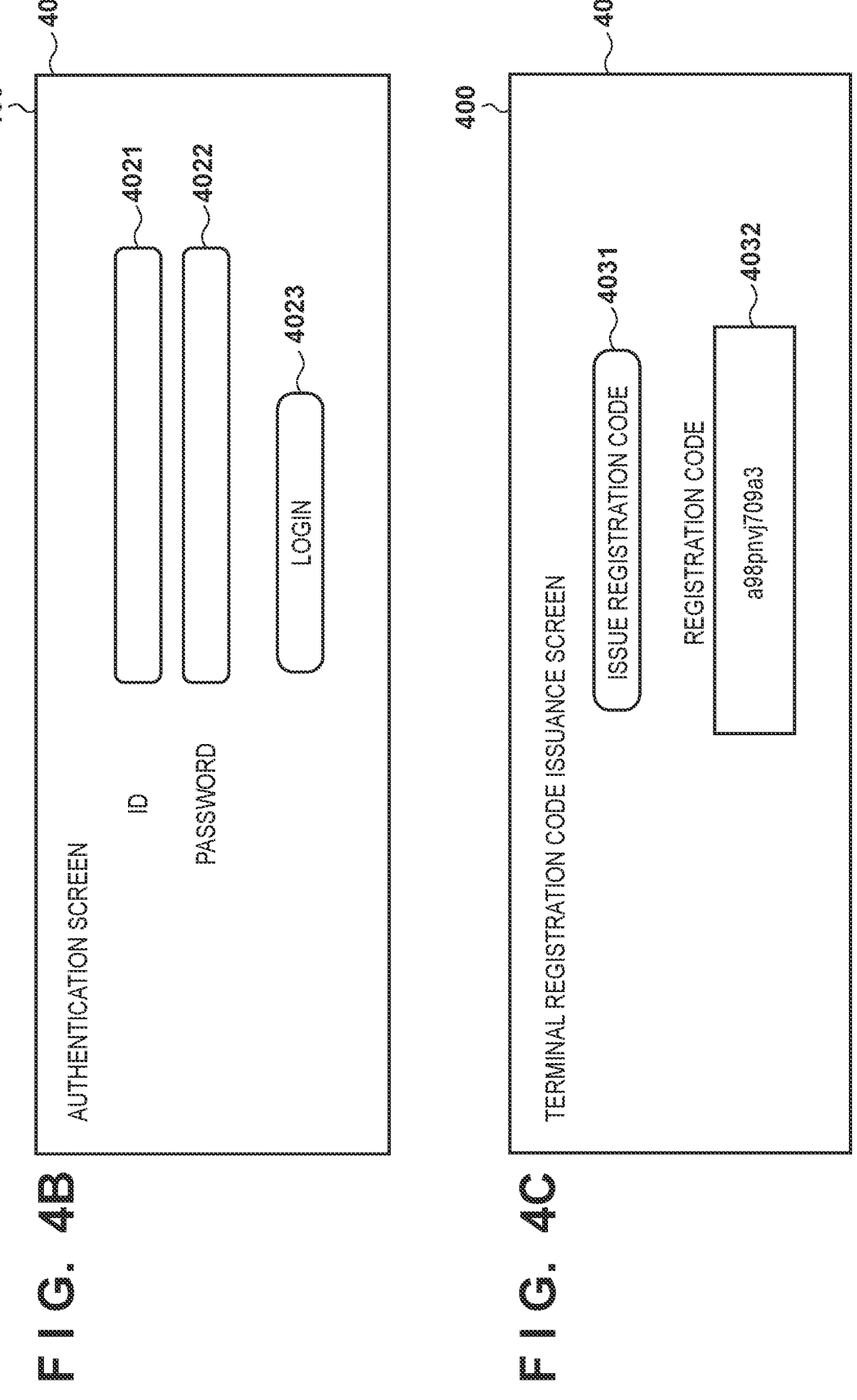
F I G. 4B
F I G. 4C

FIG. 5 eyJhbGciOiJIUzI1NiIsInR5cCI6IkpXVCJ9.

eyJzdWIiOiIxMjM0NTY3ODkwIiwib mFtZSI6
ImNsaWVudF8xMjMiLCJpYXQiOj E1MTYyMz
kwMjIsInNjb3Blcyl6Im RldmljZUFjY2Vzcyls
ImV4dHJhljp7InRlb mFudElkIjoidGVuYW50
X2EifX0.

eF2rd c9i5L348UGTsCredQ5W6BiJ_0QS_Mf
TctrYhvk

~501

```
{
  "alg": "HS256",
  "typ": "JWT"
}
```

~502

```
{
  "sub": "1234567890",
  "name": "client_123",
  "iat": 1516239022,
  "scopes": "deviceAccess",
  "extra": {
     "tenantId": "tenant_a"
  }
}
```

~503

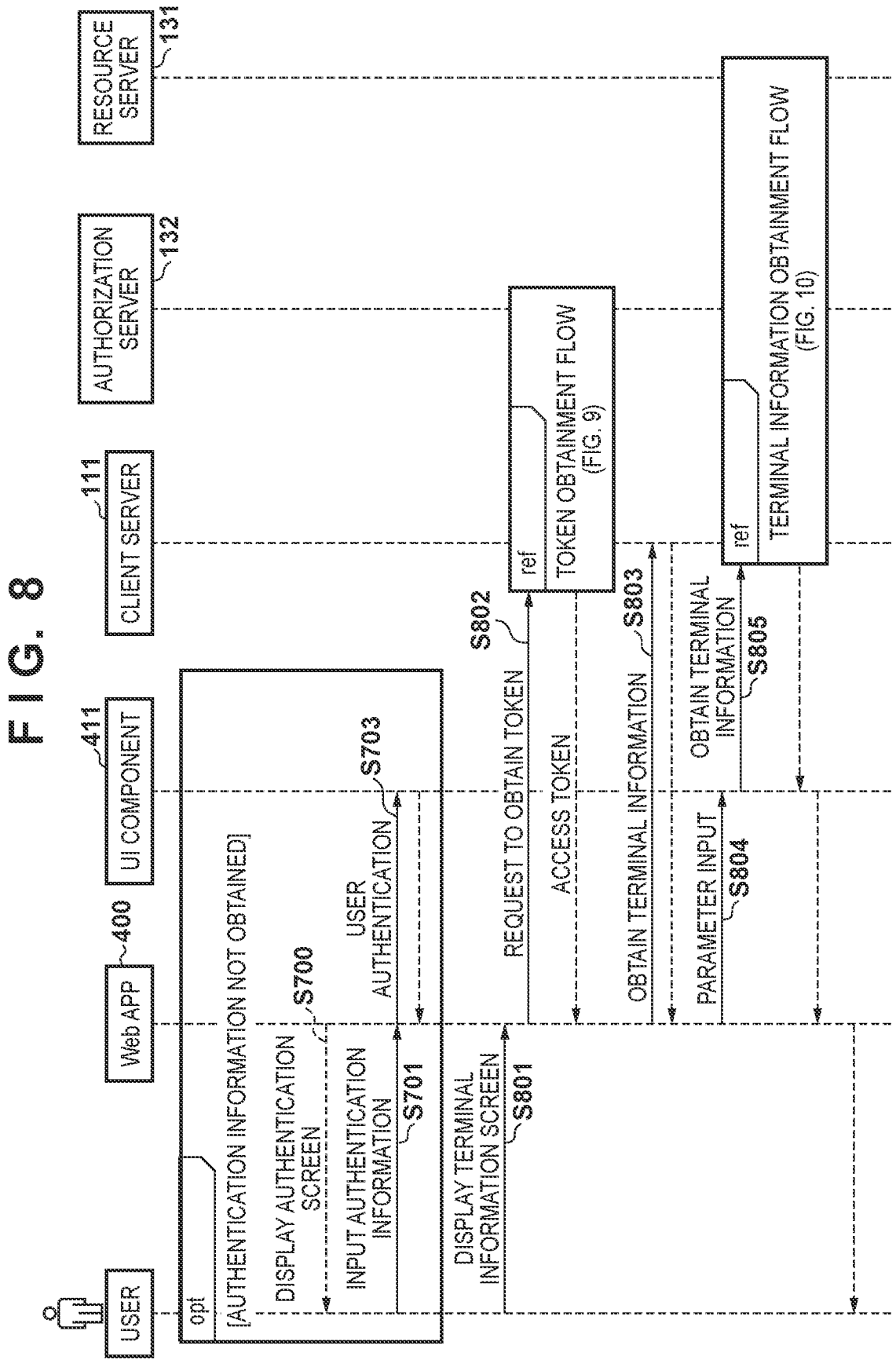
F I G. 8

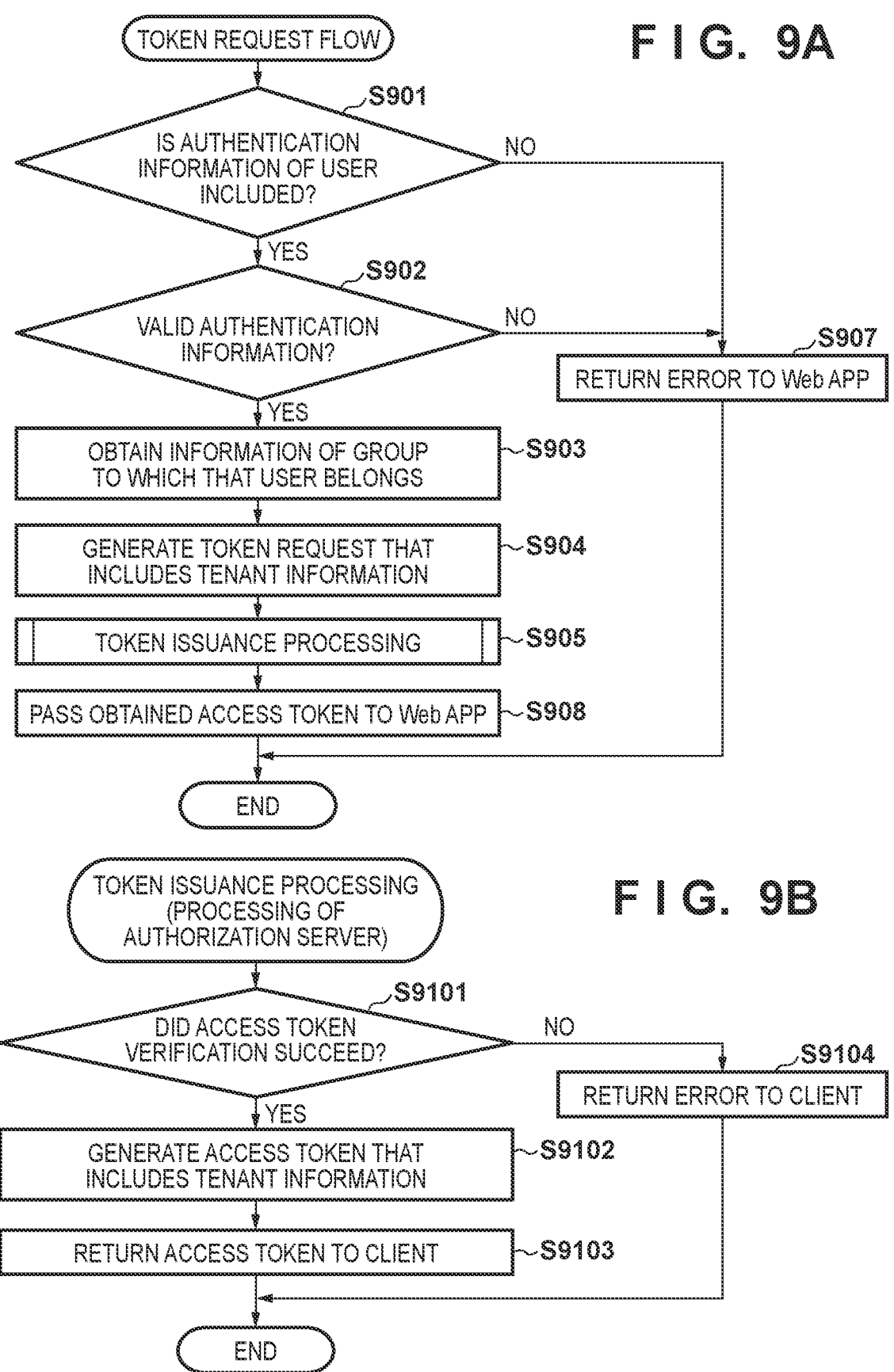

FIG. 9A

TOKEN REQUEST FLOW

S901
IS AUTHENTICATION INFORMATION OF USER INCLUDED?
NO
YES

S902
VALID AUTHENTICATION INFORMATION?
NO
YES

S907
RETURN ERROR TO Web APP

S903
OBTAIN INFORMATION OF GROUP TO WHICH THAT USER BELONGS

S904
GENERATE TOKEN REQUEST THAT INCLUDES TENANT INFORMATION

S905
TOKEN ISSUANCE PROCESSING

S908
PASS OBTAINED ACCESS TOKEN TO Web APP

END

FIG. 9B

TOKEN ISSUANCE PROCESSING (PROCESSING OF AUTHORIZATION SERVER)

S9101
DID ACCESS TOKEN VERIFICATION SUCCEED?
NO
YES

S9104
RETURN ERROR TO CLIENT

S9102
GENERATE ACCESS TOKEN THAT INCLUDES TENANT INFORMATION

S9103
RETURN ACCESS TOKEN TO CLIENT

END

F I G. 10
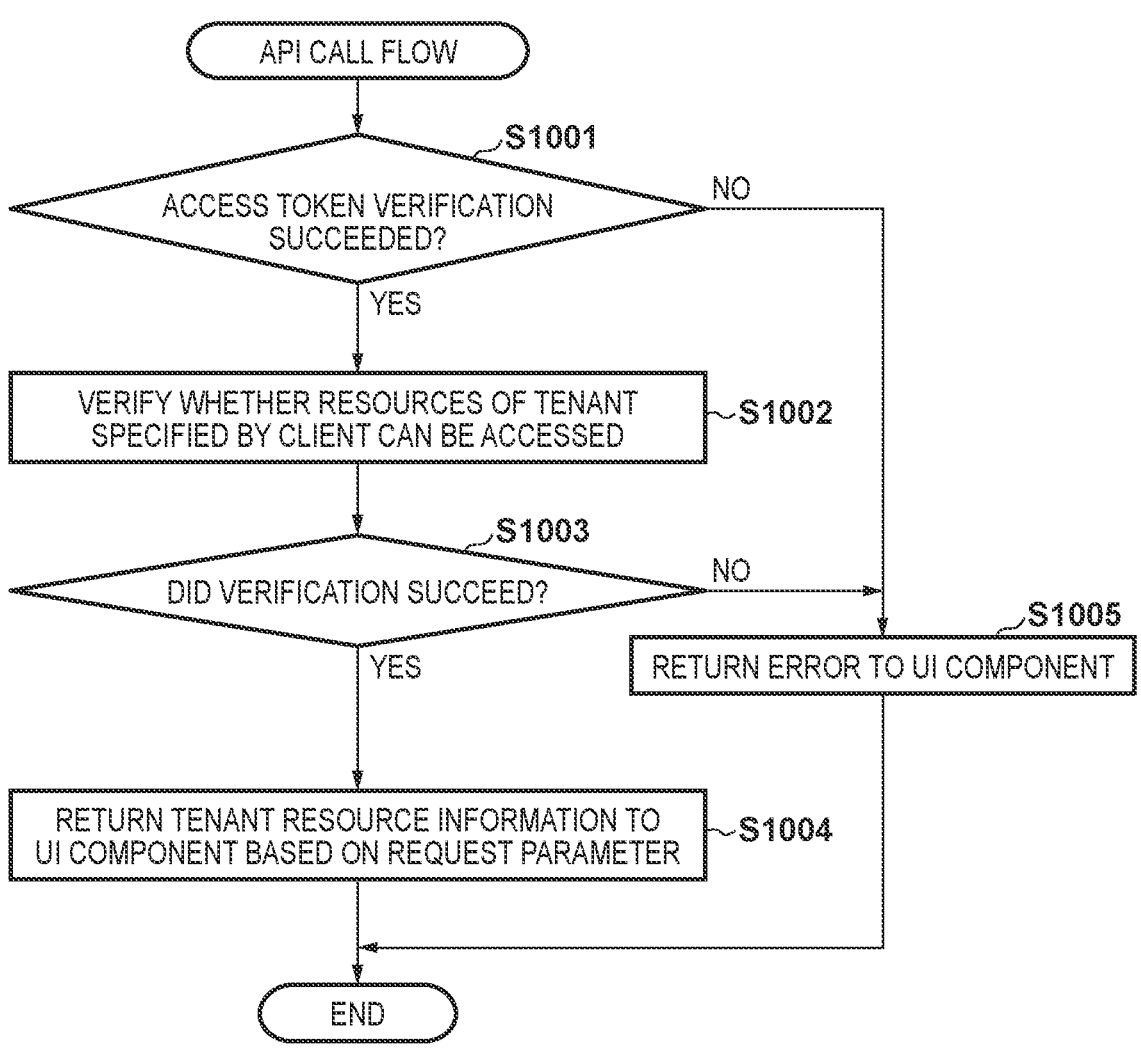

F I G. 11
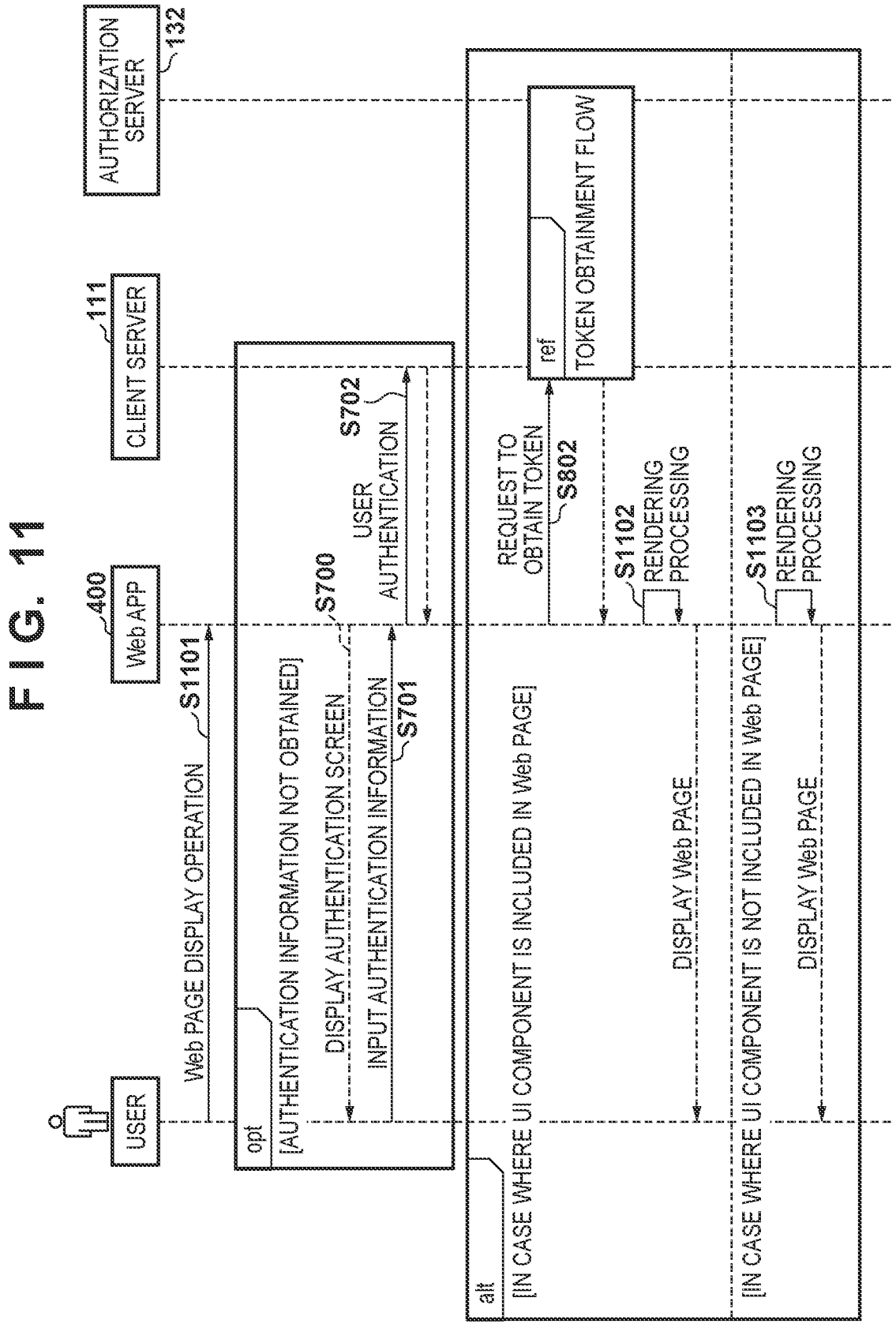

F I G. 12A

CLIENT MANAGEMENT TABLE

| CLIENT IDENTIFIER | CREDENTIAL |
|---|---|
| client_123 | ******** |
| client_abc | ***** |

F I G. 12B

TENANT MANAGEMENT TABLE

| TENANT IDENTIFIER | CLIENT IDENTIFIER | REGISTRATION CODE |
|---|---|---|
| tenant_a | client_123 | a98pnvj709a3 |
| tenant_b | client_123 | 9y8rvm854v2 |
| tenant_c | client_abc | 4xt@qj89k0d |

F I G. 12C

COMMUNICATION TERMINAL MANAGEMENT TABLE

| COMMUNICATION TERMINAL IDENTIFIER | TENANT IDENTIFIER | REGISTRATION DATE |
|---|---|---|
| device_1 | tenant_a | 2022/01/23 13:44 |
| device_2 | tenant_a | 2022/03/05 8:00 |
| device_3 | tenant_b | 2022/02/16 18:38 |
| device_4 | tenant_c | 2021/12/38 1:00 |
| device_5 | tenant_c | 2022/04/01 17:32 |

F I G. 12D

EXAMPLE OF TOKEN REQUEST

```
POST authorization/token HTTP/1.1
Host: auth.example.com
Authorization: Basic xxxxxx
Content-Type : application/x-www-form-urlencoded grant_type= client_credentials
&scope=deviceAccess
&extra={"tenantId": "tenant_a"}
```

F I G. 12E

ACCESS TOKEN MANAGEMENT TABLE

| TOKEN IDENTIFIER | TENANT IDENTIFIER | ISSUE DATE | ACCESS TOKEN |
|---|---|---|---|
| token_a | tenant_a | 2022/04/04 13:58 | eyJ... |
| token_b | tenant_b | 2022/04/05 22:23 | eyJ... |

F I G. 13A

GROUP MANAGEMENT TABLE

| GROUP IDENTIFIER | DISPLAY NAME | TENANT IDENTIFIER |
|---|---|---|
| group_a | CUSTOMER A | tenant_a |
| group_b | CUSTOMER B | tenant_b |

F I G. 13B

USER MANAGEMENT TABLE

| USER IDENTIFIER | GROUP IDENTIFIER | PASSWORD |
|---|---|---|
| user_a | group_a | ******* |
| user_b | group_b | ******* |

F I G.  13C

COMMUNICATION TERMINAL MANAGEMENT TABLE

| COMMUNICATION TERMINAL IDENTIFIER | GROUP IDENTIFIER | INSTALLATION LOCATION | TERMINAL NAME |
|---|---|---|---|
| device_1 | group_a | HEADQUARTERS 1F | DEVICE A |
| device_2 | group_b | HEADQUARTERS 2F | DEVICE B |

F I G.  13D

DESCRIPTION OF Web PAGE (UI COMPONENT 413)

```
<script src="https://ui-parts.server/bundle.js"></script>

<ui-parts_413"
        name = "DEVICE A"
        place = "HEADQUARTERS 1F"
        token = "eyJ..."
        >
</ui-parts_413>
```

F I G.  13E

ACCESS TOKEN ISSUANCE REQUEST
(IN CASE WHERE RESOURCES ARE NOT LIMITED)

```
POST authorization/token HTTP/1.1
Host: auth.example.com
Authorization: Basic xxxxxx
Content-Type: application/x-www-form-urlencoded grant_type=client_credentials
&scope=allDeviceList
```

NETWORK SYSTEM AND CONTROL METHOD THEREOF

BACKGROUND OF THE INVENTION

Field of the Invention

The present invention relates to a network system and a control method thereof.

Description of the Related Art

In web applications ("web apps" hereinafter) that run on a web browser, recent advances in computer performance, as well as the HTML, CSS, JavaScript, and the like that make up web browsers and web apps, have made it possible to implement more complex graphical user interfaces ("GUIs" hereinafter). Web apps are also increasingly able to incorporate user interface technology for simplifying the implementation of the GUI itself and communication processing for obtaining the information constituting the GUI.

In addition, it is desirable that only information that is in accordance with the permissions of the user of the web app be provided as information displayed in the web app. For example, in Japanese Patent Laid-Open No. 2020-113085, a token corresponding to a permission rule that defines a permission range for transaction content generated based on transaction information is issued to a user. This limits the information that can be accessed by that user.

When displaying information provided by a resource server having the aforementioned user interface technology, only information that is in accordance with the permissions of the user currently using the web app should be displayed and provided. Additionally, user information that allows authenticated access to web apps is managed in systems that include client servers in which web apps are managed.

Here, there are situations where an authorization server, which is prepared separately for authenticating and authorizing access to resources on the resource server, does not manage user information that enables authenticated access to the client server. In this case, the authorization server may issue an access token corresponding to credential information in the client server in response to a request for authorization from a web app. There is thus an issue in that a plurality of users who can use a web app through the aforementioned user interface technology can use the same access token uniformly, and it is not possible to provide access to different resources according to the permissions of each user.

The present invention addresses at least one of the issues with the conventional technique described above.

The present invention provides a technique which enables a client server to present UI components to a user using a web app in accordance with permissions of the user, even when a plurality of users who can use the web app have permissions enabling the users to obtain resources from a resource server.

SUMMARY OF THE INVENTION

A network system according to one aspect of the present invention has the following configuration. First aspect of the present invention is a network system comprising an information processing device that uses a web app, a resource server that provides a resource to the information processing device, a client server that accesses the resource server, and an authorization server that permits the client server to access the resource server, wherein the client server includes at least one memory storing at least one program, and at least one processor, the at least one program causing the at least one processor to: manage authentication information of a user of the information processing device and issue verification data capable of verifying that the user has been authenticated; manage a range of the resource that can be accessed by the user in association with tenant information generated by the authorization server and corresponding to the user; perform transmitting, to the authorization server, an issuance request including the tenant information related to the user corresponding to the verification data, in response to an issuance request for the first access token including the verification data, in accordance with a start of rendering of a page including a UI component from the web app; and transmit, to the web app, the first access token corresponding to the tenant information included in the issuance request received from the authorization server, the authorization server includes at least one memory storing at least one program, and at least one processor, the at least one program causing the at least one processor to: issue the first access token and transmit the first access token to the client server in response to the issuance request from the client server, the information processing device includes at least one memory storing at least one program, and at least one processor, the at least one program causing the at least one processor to: input a parameter; and transmit a request for resources using the parameter and the first access token to the resource server from the UI component, by the web app inputting the transmitted first access token into the UI component, and the resource server includes at least one memory storing at least one program, and at least one processor, the at least one program causing the at least one processor to: verify the first access token when the request including the parameter and the first access token is received from the UI component; and transmit the resource to the UI component based on the parameter and the tenant information corresponding to the first access token when the verifying of the first access token is successful.

The present invention provides an effect in which a client server can present UI components to a user using a web app in accordance with permissions of the user, even when a plurality of users who can use the web app have permissions enabling the users to obtain resources from a resource server.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention and, together with the description, serve to explain principles of the present invention.

FIG. 3A is a block diagram illustrating the function modules of a client server according to the first embodiment.

FIG. 3B is a block diagram illustrating the function modules of a resource server according to the first embodiment.

FIG. 3C is a block diagram illustrating the function modules of the authorization server according to the first embodiment.

FIG. 3D is a block diagram illustrating the function modules of a communication terminal according to the first embodiment.

FIGS. 4A to 4C are diagrams illustrating examples of screens displayed by a web app delivered from a web app delivery server according to the first embodiment.

FIG. 5 is a diagram illustrating an example of an access token issued by an access token management module.

FIG. 8 is a sequence chart illustrating processing performed when a user views communication terminal information, which is saved in the client server and the resource server, through the web app and UI components, according to the first embodiment.

FIG. 9A is a flowchart illustrating processing through which the client server, which has received an access token issuance request from a web app, obtains an access token from the authorization server and returns the access token to the web app, according to the first embodiment.

FIG. 9B is a flowchart illustrating processing executed by the authorization server in step S905 of FIG. 9A.

FIG. 10 is a flowchart illustrating processing performed when a UI component obtains terminal information from the resource server in step S805 of FIG. 8.

FIG. 11 is a sequence chart illustrating the flow of processing when a user operates a web browser in an information terminal to manipulate a web page provided by a web app, according to a second embodiment.

FIG. 12A is a diagram illustrating an example of a client management table according to the first embodiment.

FIG. 12B is a diagram illustrating an example of a tenant management table according to the first embodiment.

FIG. 12C is a diagram illustrating an example of a communication management table according to the first embodiment.

FIG. 12D is a diagram illustrating an example of a token request according to the first embodiment.

FIG. 12E is a diagram illustrating an example of an access token management table according to the first embodiment.

FIG. 13A is a diagram illustrating an example of a group management table according to the first embodiment.

FIG. 13B is a diagram illustrating an example of a user management table according to the first embodiment.

FIG. 13C is a diagram illustrating an example of a communication terminal management table according to the first embodiment.

FIG. 13D is a diagram illustrating an example of a description of a web page according to the first embodiment.

FIG. 13E is a diagram illustrating an example of an access token issuance request according to a third embodiment.

DESCRIPTION OF THE EMBODIMENTS

Figure 1:
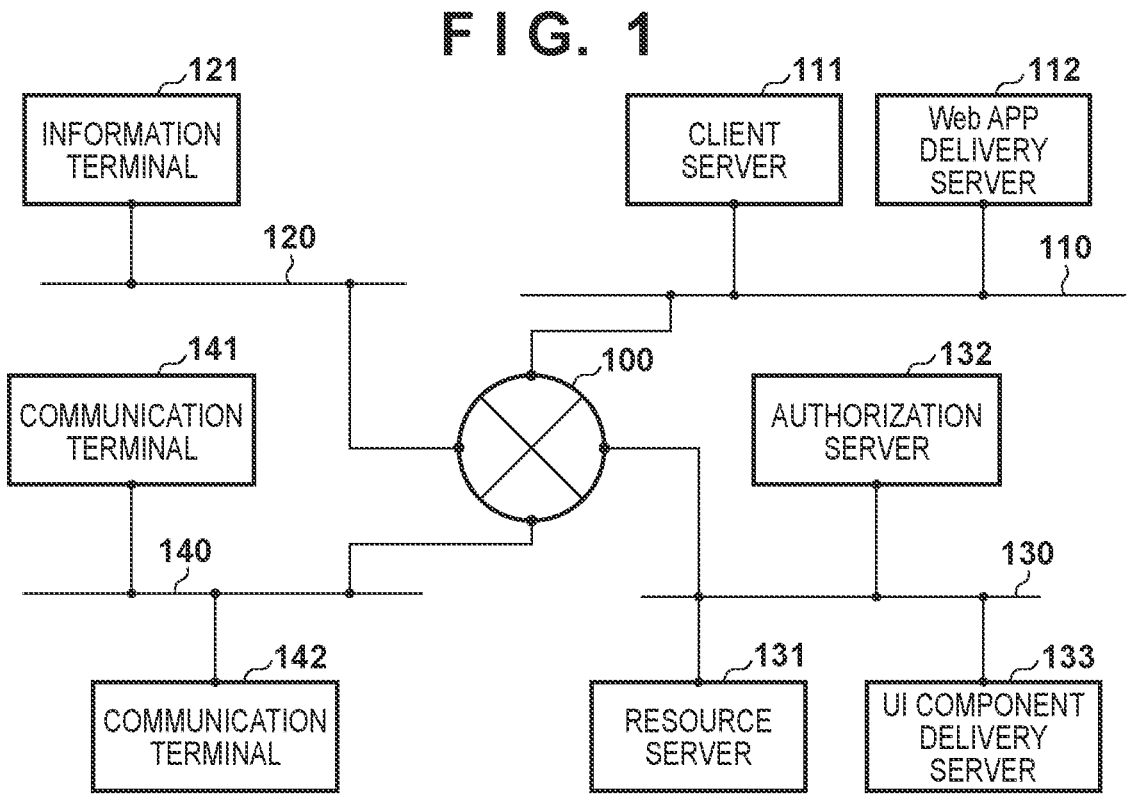
FIG. 1 is a diagram illustrating the configuration of a network system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

A network system according to the present first embodiment is implemented on a network configured as illustrated in FIG. 1.

FIG. 1 is a diagram illustrating the configuration of the network system according to the first embodiment.

A network 100 is a Wide Area Network (WAN) 100, and is constructed as a World Wide Web (WWW) system in the first embodiment. LANs 110, 120, 130, and 140 are Local Area Networks connecting the respective constituent elements to each other.

A client server 111 is a client server that manages information for a web app to display in a web browser of an information terminal 121, and stores and manages client credentials issued by an authorization server 132 for accessing information on a resource server 131.

A web app delivery server 112 is a server that delivers a web app, has a URL for delivery, and serves as a Content Delivery Network (CDN). The information terminal 121 is an information terminal for a user to operate the web app, such as a personal computer (PC) or a smartphone, for example. The information terminal 121 has a web browser function for displaying web apps, an output device (display device) for displaying and presenting the web browser to the user, an input device for accepting text input from the user, and the like (not shown).

The web app according to the first embodiment has a GUI that is displayed through the web browser. In the development of this web app, technologies such as libraries, frameworks, and the like are used to easily implement GUIs. Specifically, a series of technologies called web components, which can easily be incorporated into web apps, are used to create reusable custom components for use in web apps. In the first embodiment, incorporating web components into the web app simplifies the implementation of the GUI, the implementation of communication processing for obtaining the information constituting the GUI, and the like. In the first embodiment, user interface technologies that can be incorporated into web apps, including web components, will generally be referred to as user interface components ("UI components" hereinafter).

The resource server 131 is a server that manages user resources. The resource server 131 has an Application Program Interface (API) which, when a resource access request accompanied by an access token issued by the authorization server 132 is received, returns information accessible by a request owner after the access token is verified.

In the first embodiment, an access token-based technique is used such that only information that can be accessed in accordance with the current user's permissions can be provided through the UI components incorporated into the web app. For example, a mechanism for delegating permissions between users and clients, such as OAuth 2.0, is used. The authorization server 132 therefore also operates as an authorization system according to OAuth 2.0 or the like.

The authorization server 132 issues an access token, which serves as evidence that a client is permitted to access the resource, in response to a request from the client. Upon receiving a request to create a client, the authorization server 132 issues client credentials to the request owner upon determining that the client can access the resources of the resource server 131. The client server 111 obtains an access token for accessing the resources of the resource server 131 from the authorization server 132 by transmitting, to the authorization server 132, a token issuance request accompanied by stored client credentials.

A UI component delivery server 133 delivers UI components, has a URL for delivery, and serves as a CDN. Communication terminals 141 and 142 are managed by users accessing the web app. These communication terminals are terminals such as PCs, smartphones, multifunction peripherals (MFPs), fax machines, printers, cameras, or the like, for example, which have functions for connecting to the WAN 100 over the LAN 140. Each communication terminal actively transmits information pertaining to the communication terminal to the resource server 131, such as communication records, operation records, terminal settings, and the like, for example, which is then stored by the resource server 131. Although there are only two communication terminals in FIG. 1, there may be more communication terminals, or only one communication terminal. Each communication terminal may be wholly owned by the user accessing the web app, or may be managed by the user or an organization to which the user belongs and loaned to, or allowed to be operated by, other users.

The client server 111 and the web app delivery server 112 are connected to the WAN 100 over the LAN 110. Similarly, the information terminal 121 is connected to the WAN 100 over the LAN 120. The resource server 131 and the authorization server 132 are connected to the WAN 100 over the LAN 130. Furthermore, the communication terminals 141 and 142 are connected to the WAN 100 over the LAN 140.

Figure 2:
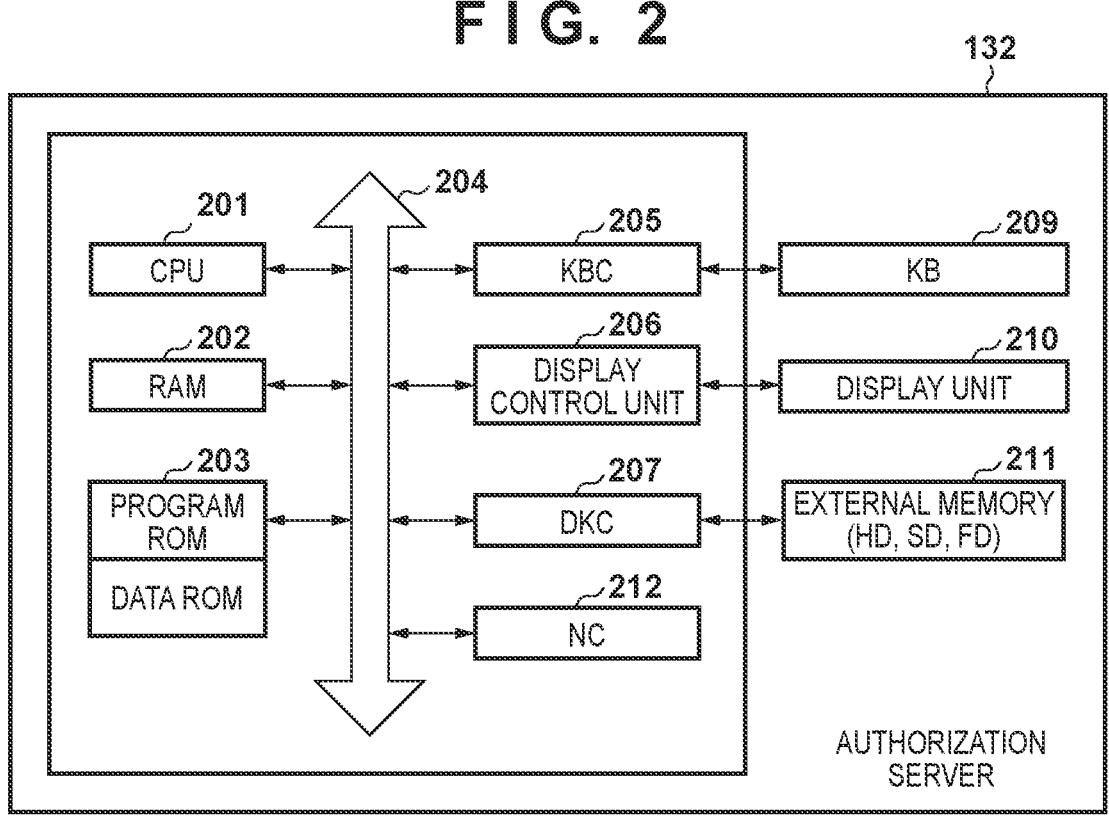
FIG. 2 is a block diagram illustrating the hardware configuration of an authorization server according to the first embodiment.

FIG. 2 is a block diagram illustrating the hardware configuration of the authorization server 132 according to the first embodiment. The configurations of the client server 111 and the resource server 131, as well as the configurations of the information terminal 121 and the communication terminals 141 and 142, are the same. Note that the hardware block diagram in FIG. 2 corresponds to a block diagram illustrating the hardware configuration of a typical information processing device, and the hardware configuration of such a typical information processing device can be applied in the server computers and terminals according to the embodiments.

In FIG. 2, a CPU 201 executes programs, such as an OS, applications, and the like, that are stored in a program ROM within a ROM 203 or loaded into a RAM 202 from an external memory 211 such as a hard disk, and controls the respective units connected to a bus 204. Here, "OS" is an acronym for "operating system", which runs on a computer, and the operating system will be referred to as an "OS" hereinafter. The processes of the flowcharts described later are implemented by executing these programs. The RAM 202 functions as the main memory, a working area, and so on for the CPU 201. A keyboard controller (KBC) 205 controls key inputs from a keyboard (KB) 209, a pointing device (not shown), or the like. A display control unit 206 controls the display of a display unit 210. A disk controller (DKC) 207 controls data access to the external memory 211, which is a hard disk (HD), a SD, a Floppy (registered trademark) disk (FD), or the like, and in which various types of data are stored. An NC 212 is connected to the network and executes processing for controlling communication with other devices connected to the network.

Note that unless otherwise specified, all the following descriptions assume that the CPU 201 is the main hardware entity that executes processes, and programs such as the OS and applications installed in the external memory 211, the ROM 203, or the like are the main software entities. The software entities are realized by the CPU 201 executing those programs.

FIGS. 3A to 3D are block diagrams illustrating the function modules of the client server 111, the resource server 131, the authorization server 132, and the communication terminals 141 and 142 according to the first embodiment.

FIGS. 3A, 3B, 3C, and 3D illustrate the module configurations of the client server 111, the resource server 131, the authorization server 132, and the communication terminals 141 and 142, respectively.

The client server 111 includes a client information management module 311, an access token management module 312, a group management module 313, a user authentication module 314, and a communication terminal management module 315. The resource server 131 includes a user resource management module 321, a token verification module 322, and an access verification module 323. The authorization server 132 includes a client management module 331, a tenant management module 332, a communication terminal management module 333, and an access token management module 334. Each of the communication terminals 141 and 142 includes a terminal registration module 351 and a terminal information transmission module 352.

The authorization server 132 will be described first, with reference to FIG. 3C.

The client management module 331 of the authorization server 132 manages client information registered in the authorization server 132, and manages which resources on the resource server 131 can be accessed by clients. When an access token issuance request to the authorization server 132 is received when creating a client, client credentials are issued to prove that the client is a client.

FIG. 12A is a diagram illustrating an example of a client management table that manages the correspondence between clients and client credentials. Each client is managed by a client identifier that uniquely identifies the client. The "credentials" are confidential information created and stored by the authorization server 132 when creating a client, and a client can be authenticated by associating the credentials with the client identifier.

The tenant management module 332 of the authorization server 132 manages tenant information registered in the authorization server 132. A "tenant" is a unit for data classification, and the client identifiers of clients who can access the tenant information are stored in association with each tenant.

FIG. 12B is a diagram illustrating an example of a tenant management table that manages the correspondence between tenants and clients. Each tenant is managed by a tenant identifier that uniquely identifies the tenant. The identifier of the client managing the tenant is registered in the client identifier. A registration code is used when the user registers communication terminal information with the tenant to which they belong.

Here, the client identifier corresponding to tenant identifiers "tenant_a" and "tenant_b" can be identified as being "client_123". This indicates that the client identified by the client identifier, namely "client_123", can access the information of both "tenant_a" and "tenant_b". The registration code is a code used when the client stores information on the communication terminal 141 in the resource server 131 in association with the tenant. Each tenant is created by the authorization server 132 upon request from the client.

The communication terminal management module 333 of the authorization server 132 manages the communication terminal information stored in the authorization server 132. This module also receives communication terminal registration requests from the client server 111 and stores communication terminal information in the authorization server 132. Each communication terminal is managed by a communication terminal identifier that uniquely identifies the communication terminal. The identifier of the tenant to which each terminal belongs is stored in the communication terminal identifier.

FIG. 12C is a diagram illustrating an example of a communication terminal management table that manages the correspondence between communication terminals and tenants.

Here, communication terminals "device_1" and "device_2" can be identified as being associated with the tenant "tenant_a". The communication terminal "device_1" can also be identified as having been stored in the authorization server 132 on "2022/01/23 13:44".

The access token management module 334 of the authorization server 132 then receives the token request from the client, generates the access token, and returns the access token to the client. The access token management module 334 stores a private key used to sign the access token issued and a public key used to verify the access token issued. The module also publicized an API for obtaining the public key in response to requests from clients, applications managed by the authorization server 132, and the like.

FIG. 5 is a diagram illustrating an example of the access token issued by the access token management module 334.

An access token 501 represents the entire character string of the issued access token. The access token is divided into a header part, a payload part, and a signature part, each connected by ".". In FIG. 5, line breaks have been inserted between each part for the sake of viewability. A header part 502 is data in the JSON format that contains information on the algorithm used for the signature, the format of the access token, and the like. From the "alg" claim, it can be seen that the access token is signed with the "HS256" algorithm. A payload part 503 contains information used by resource servers and applications that use access tokens. For example, the date and time the access token was issued can be seen from the "sub" claim, the expiration date of the access token can be seen from the "iat" claim, and so on. The extra claim is an extended claim in which an arbitrary value specified by the client at the time of the token request is stored.

FIG. 12D is a diagram illustrating one example of a token request made by the client server 111 to the authorization server 132.

The client server 111 specifies, in parameters, that the tenant identifier "tenant_a" is to be included in the extra claim at the time of the token request. An authorization header contains the client credentials issued by the authorization server 132. Upon receiving this token request, the access token management module 334 requests the client management module 331 to verify the client credentials, and if the client credentials are correct, generates the access token 501 and returns the access token 501 to the client server 111.

The client server 111 will be described next with reference to FIG. 3A.

The client information management module 311 of the client server 111 is a module that manages the client information obtained from the authorization server 132. Similar to the client management module 331 of the authorization server 132, the client information management module 311 manages client identifiers and corresponding credentials, as illustrated in FIG. 12A.

The access token management module 312 of the client server 111 manages access tokens obtained from the authorization server 132. Each access token is managed with a token identifier that uniquely identifies the access token. The tenant identifier associated with the access token is stored in association with the tenant identifier specified in the extra claim at the time of the token request.

FIG. 12E is a diagram illustrating an example of an access token management table that manages access tokens obtained from the authorization server 132 in association with which tenant each access token was issued for.

From this, it can be seen that the access token identified by the token identifier "token_a" is an access token issued for use by the tenant "tenant_a", and stores the value "eyJ . . . ".

The group management module 313 of the client server 111 manages groups to which users accessing a web app 400 (FIGS. 4A to 4C) belong. Each group is managed by a group identifier that uniquely identifies the group. A user always belongs to one group, and each group is stored with what is basically a one-to-one association with the created tenants in the authorization server 132. A display name defined for each group is used during display in the web app 400.

FIG. 13A is a diagram illustrating an example of a group management table that manages information on groups.

From this, it can be seen that the group identified by the group identifier "group_a" has a display name "customer A" and is associated with the tenant "tenant_a" in the authorization server 132.

It is assumed that each user can only obtain information related to the group to which they belong, and the group management module 313 performs control such that users cannot access information of other groups.

The user authentication module 314 of the client server 111 manages user information for accessing the web app 400. FIG. 13B is a diagram illustrating an example of a user information table that manages user information. Each user is managed by a user identifier that uniquely identifies the user. Each user's information is stored in association with a group identifier to indicate the group to which they belong. A password is confidential information required for the user to log in to the web app 400 and use all the functions of the web app 400. The user identifier and password are entered into the web app 400 through an authentication screen 402 (FIG. 4B), and the user is authenticated when the user authentication module 314 verifies that the user identifier and password match. If the authentication is successful, the user authentication module 314 issues verification data, which is proof that the user authentication was successful, and returns the verification data to the web app 400. This verification data is data in token format indicating that the user has been authenticated. In the example in FIG. 13B, it can be seen that the user managed by the user identifier "user_a" belongs to the group identified by the group identifier "group_a".

The communication terminal management module 315 of the client server 111 manages the communication terminal information of users, which is displayed in the web app 400. FIG. 13C is a diagram illustrating an example of a communication terminal management table that manages the communication terminal information. Each communication terminal is managed by a communication terminal identifier that uniquely identifies the communication terminal, and the communication terminal identifier is obtained from the communication terminal management module 333 of the authorization server 132. The group identifier is information for identifying to which group each communication terminal belongs and is managed. A terminal name and installation location are information displayed in the web app 400 to make it easier for the user to recognize the device, and are set by the user through the web app 400 independent from information in the authorization server 132, the resource server 131, and the like. In this manner, the communication terminal itself is associated with information in the authorization server 132, but may be provided with information not managed by the authorization server 132. In FIG. 13C, the communication terminal identified by the communication terminal identifier "device_1" can be identified as belonging to the group "group_a", with the installation location set as "headquarters 1F" and the terminal name set as "device A".

FIGS. 4A to 4C are diagrams illustrating examples of screens displayed by the web app 400 delivered from the web app delivery server 112 according to the first embodiment.

The web app 400 is displayed in a display of the information terminal 121 in response to the user entering the URL of the web app delivery server 112 from the web browser of the information terminal 121. Web pages 401, 402, and 403 are parts of the web app 400, and are stored in and delivered by the web app delivery server 112. Each web page has a different URL. The web page 401 is constituted by html, css, JavaScript, and the like.

FIG. 4A illustrates the web page 401 (a communication terminal information screen) for displaying the communication terminal information stored in the resource server 131 through UI components. UI components 411 to 414 are incorporated into this web page 401.

The UI components 411, 412, 413, and 414 are UI components that are stored in and delivered by the UI component delivery server 133. The URL of the UI component delivery server 133 is written in html, which is the source code of the web page 401, to load JavaScript code of each UI component. FIG. 13D is a diagram illustrating an example of the description (a partial excerpt) of the web page 401.

"https://ui-parts.server" is the URL indicating the UI component delivery server 133, and "https://ui-parts.server/bundle.js" is the JavaScript file in which the code for the UI components 411 to 414 is written. The web browser in the information terminal 121, into which the delivery URL of the web page 401 is entered, first obtains the source code of the web page 401, and stores the source code in memory. Next, the "bundle.js" file which has been delivered is obtained from the URL of the UI component delivery server 133 written in the web page 401 and stored in memory. The code written in the web page 401 and "bundle.js" is then interpreted and rendered in the web browser.

In addition, "ui-parts_413" is a definition for displaying the UI component 413, which is written in the "bundle.js" file obtained from the UI component delivery server 133, in the web page 401. The UI component 413 is rendered in the web app 400 by being written as an html tag in the web page 401 in this manner. The rendering of the UI components 413 and 414 is written in the JavaScript code of each UI component and basically cannot be manipulated from the web page 401, but passing values to predefined parameters makes it possible to display any value, change styles, and the like. For example, by passing the parameter "place="headquarters 1F"", displaying the information "headquarters 1F" in the UI component can be specified from the web page 401 side.

FIG. 4B is a diagram illustrating an example of the authentication screen 402 through which the web app 400 accepts authentication information from a user. Input fields 4021 and 4022 are input fields for entering the user identifier that uniquely identifies the user and the password set by the user, respectively. A login button 4023 is a button for transmitting the entered user identifier and password to the client server 111 to start the authentication.

FIG. 4C is a diagram illustrating an example of the web page 403 (a communication terminal registration code issuance screen) that issues a communication terminal registration code for registering communication terminal information in the resource server 131.

An issue registration code button 4031 is a button for initiating the issuance of a registration code for the communication terminal. When the button 4031 is pressed, the web app 400 transmits a request to the client server 111 to issue a registration code. A label 4032 is a label for displaying the registration code returned from the client server 111. Nothing is displayed in the label 4032 when the registration code has not yet been issued.

Returning to FIG. 3B, the resource server 131 will be described.

The user resource management module 321 of the resource server 131 stores and manages the terminal information transmitted from the communication terminal. The user resource management module 321 has an API that accepts the registration of information from communication terminals and an API that accepts the obtainment of the communication terminal information from the client server 111.

Upon accepting a request for APIs for registering and obtaining communication terminal information registration, the token verification module 322 of the resource server 131 verifies the access token accompanying the request. The respective APIs perform the registration and obtainment processing only if the verification of the access token is successful. During token verification, signature verification may be performed by the token verification module 322 using the public key used for token signing that was previously obtained from the access token management module 334 of the authorization server 132 and stored. Alternatively, the access token management module 334 of the authorization server 132 may be requested to verify the token.

When a request to obtain terminal information is received from the client server 111, the access verification module 323 of the resource server 131 verifies whether that client can access the specified resource. The access verification module 323 manages information about tenants and clients associated therewith, similar to the tenant management table in FIG. 12B. The access verification module 323 may actively obtain tenant and client information from the authorization server 132, or may passively receive events issued by the authorization server 132 and store the events in a table which the access verification module 323 manages.

The communication terminal 141 (142) will be described next with reference to FIG. 3D.

The terminal registration module 351 of the communication terminal 141 (142) performs processing for registering that terminal itself in the communication terminal management module 333 of the authorization server 132. The application installed in the communication terminal includes a user interface for terminal registration (not shown), and accepts the input of a terminal registration code from the user through a terminal registration flow (described later).

The terminal information transmission module 352 of the communication terminal 141 (142) transmits its own terminal information to the user resource management module 321 of the resource server 131.

Figure 6:
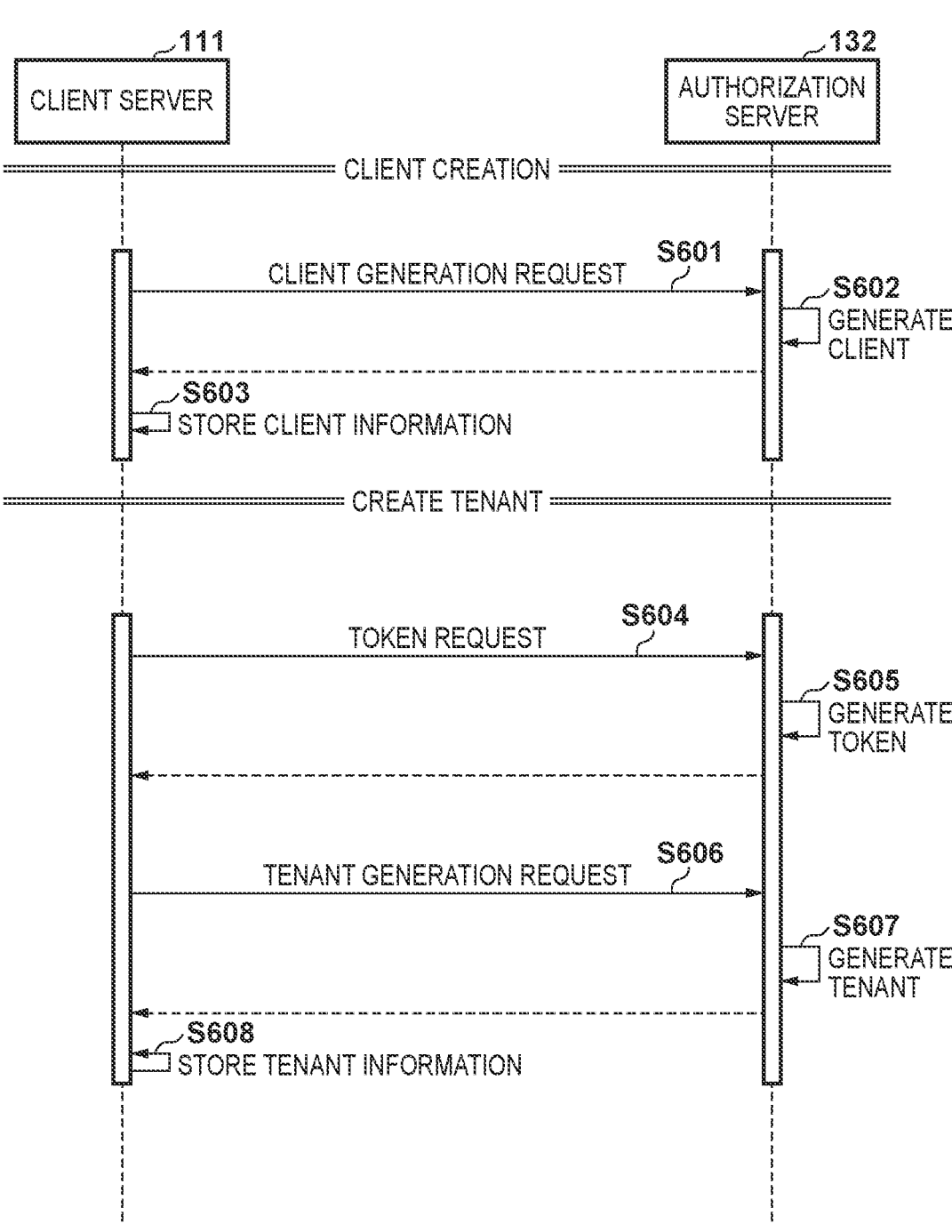
FIG. 6 is a sequence chart illustrating processing through which the client server creates a client and a tenant for the authorization server according to the first embodiment.

FIG. 6 is a sequence chart illustrating processing through which the client server 111 creates a client and a tenant for the authorization server 132 according to the first embodiment.

Upon receiving a request from the client server 111, the authorization server 132 generates client information and issues the client credentials, which makes it possible to issue an access token to the client server 111. The authorization server 132 also generates tenant information in response to a request from the client server 111. The processing involved in the client generation request in steps S601 to S603 is basically performed only once by the client server 111 before the web app 400 is operational. On the other hand, the tenant generation request in steps S604 to S608 is initiated by the client server 111 in response to a request from the user of the web app 400, and is made each time the number of user groups being managed increases.

In step S601, the client server 111 transmits a client generation request to the authorization server 132. As a result, in step S602, upon receiving the client generation request, the client management module 331 of the authorization server 132 generates and stores a client identifier and credential information corresponding thereto. The client management module 331 then returns the generated client identifier and credential information to the client server 111 as a response to the request.

As a result, in step S603, the client server 111 which has received the response to the client generation request stores the received client identifier and credential information in the client information management module 311. See the client management table in FIG. 12A.

Next, in step S604, the client server 111 transmits, to the authorization server 132, a token request for issuing an access token. The client identifier and credential information stored in the client server 111 accompany this token request as parameters. As a result, in step S605, the authorization server 132 compares the client identifier and credential information in the received token request with the client information stored in the authorization server 132, using the client management module 331, and generates and returns an access token if a matching client is present.

Next, in step S606, the client server 111 transmits, to the authorization server 132, a tenant generation request accompanying the access token obtained in the previous step. As a result, in step S607, the authorization server 132 which has received the tenant generation request first verifies the access token using the access token management module 334. This verification verifies the signature contained in the access token with the public key held, and determines whether or not the signature is an official signature. Here, if the verification is successful, the information of the client contained in the access token is extracted, and a tenant associated with that client is generated and stored. The tenant identifier of the generated tenant is then returned to the client server 111 as a response. As a result, in step S608, the client server 111 stores the returned tenant information in the group management module 313. See the tenant management table in FIG. 12B.

Figure 7:
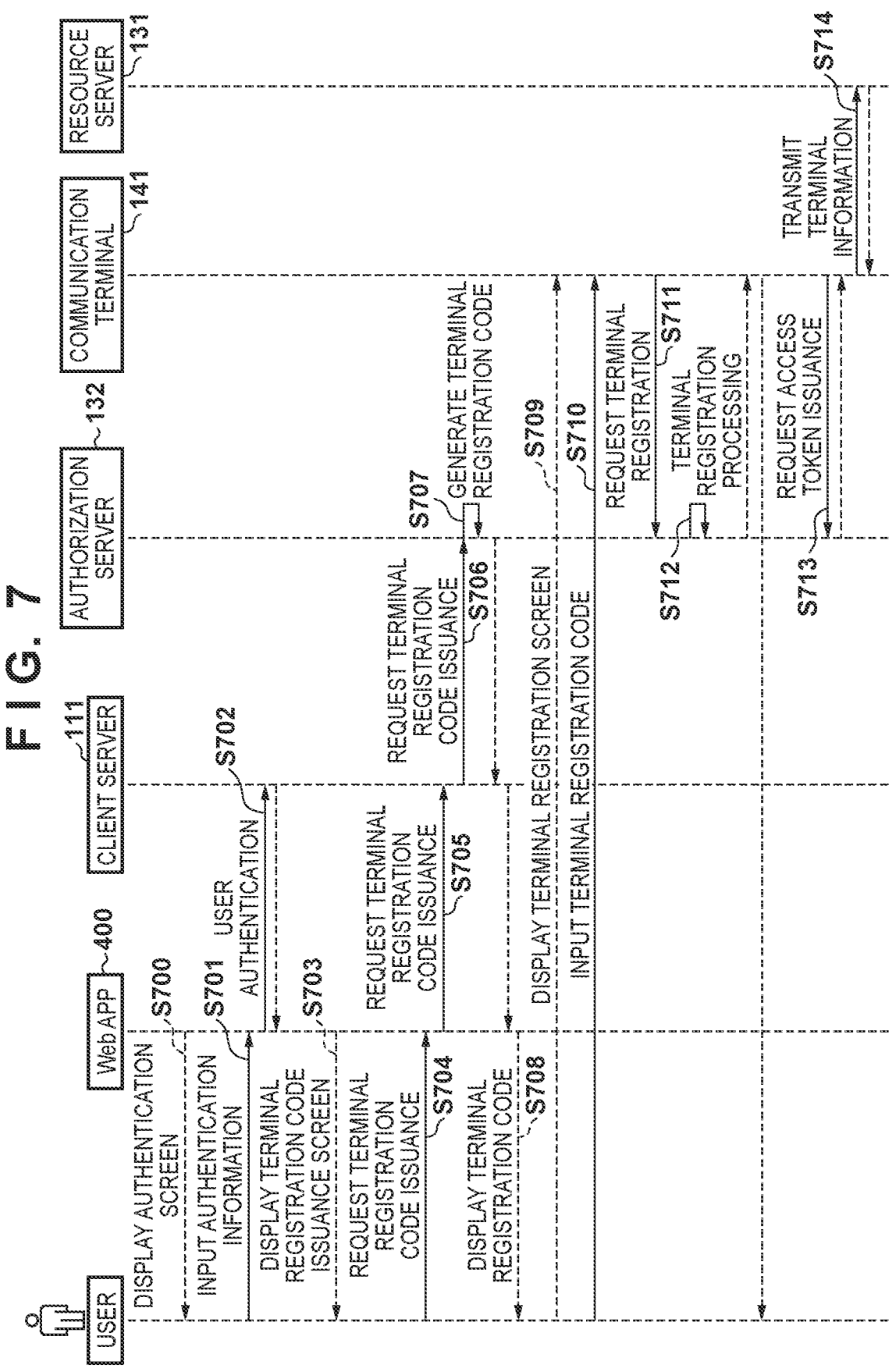
FIG. 7 is a sequence chart illustrating processing through which a user registers information on a communication terminal the user owns in the authorization server and the client server through a web app, according to the first embodiment.

FIG. 7 is a sequence chart illustrating processing through which a user registers information on a communication terminal the user owns in the authorization server 132 and the client server 111 through the web app 400, according to the first embodiment. After the communication terminal is registered through this processing, the registered communication terminal periodically transmits its own information to the resource server 131. This sequence is initiated when, through the web browser of the information terminal 121, the user operates the web app 400 to transition to the terminal registration code issuance screen 403 (FIG. 4C). The web app 400 in FIG. 7 is assumed to be executed by the web browser based on the html and JavaScript code of the web app 400 stored in the memory of the information terminal 121.

If the web app 400 does not store information that the user has been authenticated from the client server 111, the web app 400 displays the authentication screen 402 (FIG. 4B) before displaying the terminal registration code issuance screen 403, and prompts the user to enter their user identifier and password. On the other hand, if verification data is already stored in the web app 400, the sequence may start from step S703, without executing steps S700 to S702.

In step S700, the web app 400 displays the authentication screen 402 in the web browser for accepting the user's authentication information. Next, in step S701, the user enters their own user identifier and password in accordance with the display of the authentication screen 402, and presses the login button 4023. As a result, in step S702, the web app 400 makes an authentication request to the client server 111. This authentication request includes the user identifier and password entered by the user as parameters. Upon receiving this authentication request, the client server 111 compares the information of the stored user identifier and password with the parameters of the authentication request and verifies whether there is a user for whom those pieces of information match. If the user is successfully authenticated in this manner, information indicating the authentication is successful (verification data) is returned to the web app 400 with a response indicating success. The web app 400 stores the received verification data.

In step S703, the web app 400 displays the terminal registration code issuance screen 403 in the web browser. In step S704, the user operates the issue registration code button 4031 in the terminal registration code issuance screen 403 and initiates the issuance of a registration code for the communication terminal. As a result, in step S705, the web app 400 which has received the input from the user transits a request to the client server 111 to issue a terminal registration code. At this time, the web app 400 transmits the verification data stored in the web app 400 as well. Then, in step S706, the client server 111 which has received the request to issue the terminal registration code obtains the user, the group to which the user belongs, and the tenant information pertaining to the group, based on the verification data. The client server 111 then obtains an access token from the authorization server 132 (not shown) in the same manner as in steps S604 and S605 of FIG. 6, and then transmits, to the authorization server 132, a request to issue a terminal registration code. At this time, the client server 111 transmits the obtained access token and information on the tenant to which the requesting user belongs.

Next, in step S707, the authorization server 132 which has received the request to issue a terminal registration code verifies the access token and, if the verification is successful, generates a registration code for the communication terminal. The registration code of this communication terminal is stored in association with the tenant information contained in the parameters of the request to issue the terminal registration code. If a registration code associated with that tenant has already been stored, the stored code may be used, or a new code may be generated and stored. The authorization server 132 then returns the registration code for the communication terminal to the client server 111. The client server 111 returns the received terminal registration code to the web app 400.

In this manner, in step S708, the web app 400 displays the obtained registration code in the terminal registration code issuance screen 403 as illustrated in FIG. 4C, for example. Then, in step S709, the user operates the communication terminal 141 and displays a terminal registration screen (not shown). Then, in step S710, the user enters the terminal registration code displayed in the terminal registration code issuance screen 403 in step S708 into an input field in the terminal registration screen of the communication terminal 141.

In this manner, in step S711, the communication terminal 141 which has accepted the terminal registration code from the user transmits a terminal registration request to the authorization server 132. At this time, a terminal registration code is also transmitted as a parameter of the request. As a result, in step S712, the communication terminal management module 333 of the authorization server 132 which has received the terminal registration request inquires with the tenant management module 332 to find if a corresponding terminal registration code is present. If a terminal registration code is present, the associated tenant identifier is obtained, and the communication terminal information is generated and stored with the tenant identifier. An access token for making a request to the resource server 131, and a success response, are then returned to the communication terminal 141. At this time, a refresh token for reissuing the access token may be returned as well. Upon receiving the success response in this manner, the communication terminal 141 transmits a message to the terminal registration screen indicating that the terminal registration is complete. Then, in step S714, the communication terminal 141 transmits its own terminal information to the resource server 131. Step S714 is executed from the communication terminal 141 on a regular or irregular basis.

On the other hand, if the expiration date of the access token obtained in step S712 has passed, in step S713, the communication terminal 141 transmits, to the authorization server 132, a request to issue an access token along with a refresh token. The access token management module 334 of the authorization server 132 that has received this issuance request verifies the refresh token in the same manner as with the access token in step S712, and if the verification is successful, returns the newly-generated access token to the communication terminal 141. This sequence may be skipped if the access token held by the communication terminal 141 is still within the expiration date.

In step S714, the communication terminal 141 transmits its own terminal information to the resource server 131 along with the access token. Upon receiving this access token, the user resource management module 321 of the resource server 131 requests the token verification module 322 to verify the access token. If the access token is successfully verified, the user resource management module 321 stores the received terminal information and returns a success response to the communication terminal 141.

The registration of the communication terminal information using a registration code is merely one example of a means for registering the tenant information of the authorization server 132 and the group information of the client server 111 in association with each other, and another means may be used to associate these pieces of information.

FIG. 8 is a sequence chart illustrating processing performed when the user views the communication terminal information, which is saved in the client server 111 and the resource server 131, through the web app 400 and the UI component 411, according to the first embodiment. Note that although only UI component 411 is illustrated in FIG. 8, two or more UI components may be included. This sequence is initiated when, through the web browser of the information terminal 121, the user operates the web app 400 to transition to a terminal information screen (the web page 401). The web app 400 and the UI component 411 in FIG. 8 are assumed to be executed by the web browser based on the html and JavaScript code of the web app 400 and the JavaScript code of the UI component 411, which are stored in the memory of the information terminal 121.

When the user initiates the transition to the terminal information screen, if verification data has not yet been stored in the web browser, a login screen is displayed in the same manner as in steps S700 to S702, and the input of authentication information by the user is accepted. In this manner, if the authentication is successful in step S702, the sequence moves to step S801. If verification data is already stored, the processing starts from step S801.

In step S801, upon receiving a request to display (start rendering) the terminal information screen, the web app 400 starts the series of processing. In step S802, the web app 400 transmits, to the client server 111, a request to issue an access token. At this time, this issuance request is transmitted with the user's verification data included therein. Upon receiving this request to issue an access token, the client server 111 transmits, to the authorization server 132, a request to issue an access token, and returns the obtained access token to the web app 400.

FIG. 9A is a flowchart illustrating processing through which the client server 111, which has received the access token issuance request from the web app 400, obtains an access token from the authorization server 132 and returns the access token to the web app 400, according to the first embodiment.

The processing illustrated in the flowchart in FIG. 9A is initiated by the web app 400 transmitting, to the client server 111, a request to issue an access token in step S802 of FIG. 8.

First, in step S901, the user authentication module 314 of the client server 111 confirms whether the request received from the web app 400 contains verification data. If verification data is included, the sequence moves to step S902, and if not, the sequence moves to step S907, where the processing is ended through an error provided through the web app 400.

In step S902, the user authentication module 314 determines whether the received verification data is verification data the user authentication module 314 issued itself. If the verification of the verification data is successful by determining in step S902 that the verification data was issued by the user authentication module 314 itself, the sequence moves to step S903, whereas if the verification data is determined to be invalid, the sequence moves to step S907. In step S903, the user authentication module 314 determines the user identifier associated with the verification data and obtains, from the group management module 313, the group identifier and tenant identifier of the group to which that user belongs. The sequence then moves to step S904, where the access token management module 312 generates, for the authorization server 132, a request to issue an access token. This request includes the tenant identifier obtained in step S903. The sequence then moves to step S905, where the access token management module 312 transmits, to the authorization server 132, the request to issue the access token generated in step S904, and obtains the access token. The processing of step S905 will be described later with reference to the flowchart in FIG. 9B. The sequence then moves to step S906, where the client server 111 returns the obtained access token to the web app 400, and then ends this processing.

FIG. 9B is a flowchart illustrating processing executed by the authorization server 132 in step S905 of FIG. 9A. This processing is initiated in response to the authorization server 132 receiving a token issuance request transmitted from the client server 111.

In step S9101, the authorization server 132 which has received the request to issue an access token verifies the received access token using the access token management module 334. The verification of the access token is performed by verifying the signature contained in the access token or the like. If the verification of the access token is successful in step S9101, the sequence moves to step S9102, whereas if the access token is determined to be invalid, the sequence moves to step S9104. In step S9102, the access token management module 334 of the authorization server 132 generates an access token that includes, in the extended claim, the tenant identifier included in that request. Then, in step S9103, the authorization server 132 returns the generated access token to the client server 111, and then ends this processing. In step S904, the authorization server 132 determines that the received access token is invalid, returns an error to the client server 111, and then ends this processing.

The descriptions will now return to the screen display flow in FIG. 8.

In step S803, the web app 400 obtains, from the client server 111, the communication terminal information that can be obtained by the user. The information obtained here is, for example, information such as the terminal identifier, the group identifier, the installation location, the terminal name, and the like managed in the communication terminal management table in FIG. 13C.

Next, in step S804, the web app 400 inputs values for the parameters defined by the UI component 411. These parameters are, for example, information such as the terminal name, the installation location, the access token, and the like. Then, in step S805, the UI component 411 which has accepted the input of the parameters obtains the terminal information to be displayed in the web browser from the resource server 131. The access token input as a parameter in step S804 is transmitted with the request at this time. In this manner, upon the completion of all the processing up to step S805, the web browser renders the information of the web app 400 and the UI component 411 in the screen, and then ends this sequence.

FIG. 10 is a flowchart illustrating processing performed when the UI component 411 obtains the terminal information from the resource server 131 in step S805 of FIG. 8. The processing illustrated in this flowchart is initiated in response to the resource server 131 receiving a request to obtain a resource from the UI component 411. The information obtained here is assumed to be a list of the communication terminal information managed by the tenant specified by the client.

First, in step S1001, the resource server 131 verifies the validity of the received access token by verifying the signature in the received access token using the token verification module 322. If the verification of the access token is successful here, the sequence moves to step S1002, whereas if the access token is determined to be invalid, the sequence moves to step S1005. In step S1002, the resource server 131 verifies whether the resources of the tenant specified by the client can be accessed using the access verification module 323. At this time, the access verification module 323 obtains the client identifier included in the payload part of the access token and the tenant identifier in the extended claim. Next, referring to the tenant management table (FIG. 12B) in the access verification module 323, whether the client belongs to the tenant corresponding to that tenant identifier is confirmed, and if the client belongs to that tenant, it is determined that the client can access the communication terminal information managed by that tenant.

In this manner, the sequence moves to step S1003, where the resource server 131 determines whether the access verification module 323 has determined that access is possible; if so, the sequence moves to step S1004, and if not, the sequence moves to step S1005. In step S1004, the resource server 131 sends, to the user resource management module 321, a command to obtain a list of the communication terminal information pertaining to that tenant. The obtained list of the communication terminal information is then returned to the UI component 411, and this processing then ends. On the other hand, in step S1005, the resource server 131 determines that the access token is invalid or that the access token is valid but the client has requested access to a resource that cannot be accessed, returns an error to the UI component 411, and ends this processing.

As described above, according to the first embodiment, a client server that manages users can be controlled to obtain access tokens from an authorization server according to the permissions of individual users and pass those access tokens to a web app that incorporates UI components. In other words, an effect is achieved in which the authorization server and a resource server can present information to users through UI components in a web app according to the permissions of each user, without providing permissions to individual users to access the web app.

Second Embodiment

In the foregoing first embodiment, in the processing for obtaining the communication terminal information in FIG. 8, the web app 400 makes a request to obtain an access token to the client server 111 in order to obtain an access token to pass to the incorporated UI component 411, and then input the parameters of the UI component 411. In contrast, the second embodiment will describe an embodiment in which the web app 400 does not obtain unnecessary tokens when a transition to a web page that does not contain UI components occurs.

FIG. 11 is a sequence chart illustrating the flow of processing when a user operates a web browser in the information terminal 121 to manipulate a web page provided by the web app 400, according to the second embodiment. This sequence is initiated in response to the user entering a URL that indicates the web page of the web app 400 as a URL of the web browser. In this sequence, processing similar to that of the sequence used in FIGS. 7 and 8 according to the first embodiment will be given the same reference signs, and will not be described.

In step S1101, the user enters a URL indicating a web page provided by the web app 400 into the web browser. The web page provided by the web app 400 is, for example, the communication terminal information screen illustrated in FIG. 4A, the terminal registration code obtainment screen illustrated in FIG. 4C, or the like. At this time, if verification data of the accessing user is required by the web page being displayed, user authentication is performed as in steps S700 to S702, and the verification data is saved in the browser. Then, if the web page to be displayed includes UI components, the sequence moves to step S802 and the above-described processing is executed. On the other hand, if the web page does not contain UI components, the sequence moves to step S1103.

If the web page to be displayed includes UI components, a series of processing similar to S802 and the token obtainment flow of FIGS. 9A and 9B is performed, and the web app 400 obtains an access token to be input into the parameters of the UI components. Then, in step S1102, the web app 400 executes the JavaScript code necessary to render the UI, and renders the web page as written in the html and CSS. At this time, code execution includes the obtainment of the communication terminal information from the client server 111 in step S803, as well as processing performed by UI components such as steps S804 and S805 and the terminal information obtainment flow in FIG. 10. Other communication processing with an external server (not shown) may be performed as well. After all rendering processing is completed in this manner, the web browser completes the display of the web page and then ends this sequence.

On the other hand, if the web page does not contain any UI components, the same rending processing as in step S1102 is performed in step S1103 without obtaining a token. However, unlike step S1102, in step S1103, no processing related to UI components is performed here. When all rendering processing is completed in this manner, the web browser completes the display of the web page and then ends this sequence.

As described above, according to the second embodiment, the web app determines whether the web page to be displayed contains UI components, and whether to make a token obtainment request to the client server 111. This can be expected to reduce the obtainment and management of unnecessary access tokens, which reduces security risks and lightens the load of the communication processing.

Third Embodiment

In the first embodiment described above, in the request to issue an access token made from the client server 111 to the authorization server 132 in step S904 of FIG. 9A, information on the resources to be accessed was specified in the request by being included in the extended claim. The authorization server 132 then included the information on the resources within the generated access token. However, if the client server 111 uses access tokens without a token obtainment request from the web app 400, e.g., when obtaining resources pertaining to all the communication terminal information managed by the client server 111, there is no need to limit the resources to be accessed. Accordingly, the third embodiment will describe an example of the client server 111 making, to the authorization server 132, a request to issue an access token when the resources to be accessed are not limited.

Upon receiving this request, the authorization server 132 generates an access token without an extended claim and returns that access token to the client server 111. The resource server 131, which has an API that obtains the communication terminal information, controls whether an extended claim is necessary in the access token according to the API to be prepared. For example, an API that returns information to be displayed by a UI component requires that resource information be included in the extended claim, and therefore returns an error if an extended claim is not included. If the API is prepared for the client server 111, an API provision unit of the resource server 131 performs access control only with the permissions held by the client, regardless of whether an extended claim is present.

As described above, according to the third embodiment, the API provision unit of the resource server controls whether an extended claim is required for each API provided, and the client server can use different access tokens according to the purpose, which enables flexible resource access.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-087882, filed May 30, 2022 which is hereby incorporated by reference herein in its entirety.

What is claimed is:

1. A network system comprising a resource server that provides a resource, and a client server that accesses the resource server, wherein the client server includes at least one memory storing at least one program, and at least one processor, the at least one program causing the at least one processor to:

manage user information of a user who can access a web application in which code for rendering a page with the resource provided by the resource server is implemented, wherein the user accesses the web application using a web browser executed on an information processing device;

issue, to the web application, verification data capable of verifying that the user has been authenticated;

perform transmitting, to an authorization server, an issuance request including tenant information corresponding to the verification data to obtain an access token, in response to receiving a token request, based on rendering of a page including a user interface (UI) component by the web application, including the verification data from the web application; and transmit, to the web application, the access token obtained from the authorization server, wherein the UI component incorporated in the page of the web application transmits a resource request for resources using the access token to the resource server, by the web application inputting the access token into the UI component, and wherein the resource server includes at least one memory storing at least one program, and at least one processor, the at least one program causing the at least one processor to:

verify the access token when the resource request including the access token is received from the UI component; and in a case where the verifying of the access token is successful, transmit, to the UI component, the resource managed by a tenant corresponding to the tenant information included in the access token, wherein the UI component displays, in the page of the web application, a UI based on the resource received from the resource server.

2. The network system according to claim 1,
wherein
the client server transmits, to the authorization server, an issuance request for a registration code of a communication terminal of the user for which the verification data is issued according to an operation of the user on the web application, the issuance request including tenant information;

wherein the web application displays the terminal registration code that is issued by the authorization server in response to the issuance request for the registration code and received from the client server; wherein the communication terminal transmits a terminal registration input by the user to the authorization server; and wherein the authorization server registers the communication terminal in the network system and returns another access token for making a request to the resource server to store information of the communication terminal as the resource.

3. The network system according to claim 2,
wherein the authorization server stores an identifier of the communication terminal registered through the registering in association with an identifier of the tenant information and the terminal registration code.

4. The network system according to claim 2,
wherein the resource includes at least one of a communication record, an operation record, and terminal settings of the communication terminal.

5. The network system according to claim 2,
wherein the resource server includes an application programming interface (API) that accepts information from the communication terminal and an API that accepts the request from the UI component.

6. The network system according to claim 1,
wherein the authorization server generates the tenant information in response to a request from the user who uses the web application, and transmits the tenant information to the client server to be stored in the client server.

7. The network system according to claim 1,
wherein the client server does not receive a token request from the web application and transmit, to the authorization server, an issuance request to obtain an access token when starting rendering of a page that does not include the UI component by the web application.

8. The network system according to claim 1,
wherein the verification data is data in token format indicating that the user has been authenticated.

9. A control method for controlling a network system including a resource server that provides a resource, and a client server that accesses the resource server, the control method comprising:

the client server:

managing user information of a user who can access a web application in which code for rendering a page with the resource provided by the resource server is implemented, wherein the user accesses the web application using a web browser executed on an information processing device;

issuing, to the web application, verification data capable of verifying that the user has been authenticated;

transmitting, to an authorization server, an issuance request including tenant information corresponding to the verification data to obtain an access token, in response to receiving a token request, based on rendering of a page including a user interface (UI) component by the web application, including the verification data from the web application; and transmitting, to the web application, the access token obtained from the authorization server, wherein the UI component incorporated in the page of the web applications transmits a resource a request for resources using the access token to the resource server, by the web application inputting the access token into the UI component, and the resource server:

verifying the access token when the resource request including the access token is received from the UI component; and in a case where the verifying of the access token is successful, transmitting, to the UI component, the resource managed by a tenant corresponding to the tenant information included in the access token, wherein the UI component displays, in the page of the web application, a UI based on the resource received from the resource server.

10. A non-transitory computer-readable medium having stored therein a program, the program causing a computer to:

in a case where a resource request including an access token is received from a user interface (UI) component, verify the access token; and in a case where the verifying of the access token is successful, transmit, to the UI component, the resource managed by a tenant corresponding to tenant information included in the access token, wherein the UI component displays, in a page of a web application, a UI based on the resource.

11. A non-transitory computer-readable medium having stored therein a program, the program causing a computer to:

manage user information of a user who can access a web application in which code for rendering a page with the resource provided by a resource server is implemented, wherein the user accesses the web application using a web browser executed on the information processing device;

issue, to the web application, verification data capable of verifying that the user has been authenticated;

perform transmitting, to an authorization server, an issuance request including tenant information corresponding to the verification data to obtain an access token, in response to receiving a token request, based on rendering of a page including a user interface (UI) component by the web application, including the verification data from the web application; and transmit, to the web application, the access token obtained from the authorization server, wherein the UI component incorporated in a page of the web application transmits a resource request for resources using the access token to the resource server, by the web application inputting the access token into the UI component, and the UI component displays, in the page of the web application, a UI based on the resource received from the resource server.

* * * * *